United States Patent [19]

Goto

[11] Patent Number: 5,379,394
[45] Date of Patent: Jan. 3, 1995

[54] MICROPROCESSOR WITH TWO GROUPS OF INTERNAL BUSES

[75] Inventor: Harutaka Goto, Yokohama, Japan

[73] Assignee: Kabushiki Kaisha Toshiba, Kawasaki, Japan

[21] Appl. No.: 552,086

[22] Filed: Jul. 13, 1990

[30] Foreign Application Priority Data

Jul. 13, 1989 [JP] Japan .................................. 1-179066

[51] Int. Cl.$^6$ ............................................ G06F 13/00
[52] U.S. Cl. ............................... 395/425; 395/800; 395/200; 364/232.8; 364/964.31; 364/DIG. 2
[58] Field of Search ................... 364/DIG. 1, DIG. 2; 395/425, 325, 800, 200; 370/58.1

[56] References Cited

U.S. PATENT DOCUMENTS

| | | | |
|---|---|---|---|
| 4,467,414 | 8/1984 | Akagi et al. ........................... | 364/200 |
| 4,488,256 | 12/1984 | Zolnowsky et al. ................. | 395/400 |
| 4,699,043 | 5/1987 | Kaplinsky ............................. | 395/400 |
| 4,837,739 | 6/1989 | McGill et al. ........................ | 395/325 |
| 4,912,636 | 3/1990 | Magar et al. ........................ | 395/425 |
| 4,916,603 | 4/1990 | Ryan et al. .......................... | 395/425 |
| 5,067,078 | 11/1991 | Talgam et al. ....................... | 395/400 |
| 5,073,969 | 12/1991 | Shoemaker .......................... | 395/725 |
| 5,097,413 | 3/1992 | Mensch, Jr. .......................... | 395/775 |
| 5,117,350 | 5/1992 | Parrish et al. ....................... | 395/425 |
| 5,163,133 | 11/1992 | Morgan et al. ...................... | 395/800 |

FOREIGN PATENT DOCUMENTS

0153779 9/1985 European Pat. Off. .
2200481 8/1988 United Kingdom .

OTHER PUBLICATIONS

Goss "Motorola's 88000: Integration, Performances and Applications," IEEE Compcon 89, Spring Digest of Papers, pp. 20–26, (Feb. 1989).

*Primary Examiner*—Paul V. Kulik
*Assistant Examiner*—Paul R. Lintz
*Attorney, Agent, or Firm*—Foley & Lardner

[57] ABSTRACT

A microprocessor has a CPU, cache memories including TLBs, an internal memory control section (IMC) for controlling the data access operation to the cache memories, an external bus controller for controlling the data input/output operation between external memories and the cache memories, a first group of internal buses for connecting the CPU, the cache memories and IMC, and for transferring logical addresses, logical data and data among the CPU and the cache memories, and a second group of internal buses for connecting the cache memories, IMC and the external bus controller, and for transferring data among the cache memories and the external memories. Each cache memory and IMC are connected to the first group of internal buses and to the second group of internal buses in parallel, and the IMC controls the use of the second group of internal buses, and the data input/output operation to the group of the internal memories.

11 Claims, 3 Drawing Sheets

MICROPROCESSOR WITH TWO GROUPS OF INTERNAL BUSES

BACKGROUND OF THE INVENTION

1. Field of the Prior Art

This invention relates to a general-purpose microprocessor, and particularly to a microprocessor containing a cache memory.

2. Description of the Prior Art

FIG. 1 is a structural diagram of a conventional microprocessor or CPU (Central Processing Unit). A conventional CPU 10 is mainly composed of an arithmetic processing unit 20 (PU), a memory management unit 13 (MMU), an instruction cache memory 12, a data cache memory 11 and an external bus interface unit or external bus control unit 14 (BIU). The PU 20 and the MMU 13 are connected to each other through a logic bus or instruction logic bus 15 and a data logic address bus 16. Moreover, the MMU 13 and the BIU 14 are connected to each other through physical address bus 18. Furthermore, the PU 20 and the BIU 14 are connected to each other through an internal data bus 17.

Hereinafter, operation of the conventional CPU 10 laving the composition as mentioned above will be explained. For example, when the PU 20 reads operand data, a logic address is outputted to the data logic address bus 16. Then, the data cache 11 checks whether the address is stored in the data cache 11, or the address coincides with an address value in the data cache 11. When the coincidence is recognized, since objective operand data are cached in the data cache 11, the data cache 11 transfers the data to the PU 20 through the internal data bus 17.

If there is no coincidence, since the operand data are not cached in the data cache 11, the data is transferred to the data cache 31 and the PU 20 from an external memory (not shown). Namely, the MMU 13 translates the logic address on the bus 16 into a specific physical address in the memory, and transfers the result to the BIU 14 through the physical address bus 18. Then, the BIU outputs an address corresponding to the objective data to an external address bus 30. As the result, data stored in an external memory (not shown) are transferred to the PU 20 through an external data bus 31 and the internal data bus 17. At the same time, the data are written in the data cache 11. In this manner, the reading operation for operand data is completed.

While the PU 20 and the BIU 14 use the internal data bus 17 in common, the BIU 14 cannot use the internal data bus 17, for example, while data are being transferred from an external memory to the CPU 20 through the internal data bus 17. Accordingly, the BIU 14 cannot transfer data to the data cache memory 11 or the instruction cache memory 12 through the internal data bus 17 when the PU 20 is using the internal data bus 17.

When the BIU 14 renews the data cache 11 or the instruction cache 12 through the internal data bus 17, the PU 20 can not use the internal data bus 17. Particularly, when the line size of these caches 11 and 12 is relatively large, the BIU 14 occupies the internal data bus 17 for a long time. During this time, the PU 20 must be in the time-waiting state, thus the throughput of the CPU 10 as a whole is reduced.

The mentioned problems are in the case of the reading operation of operands data. Moreover, in other operation, for example an instruction fetch operation, similar problems are also caused because the internal data bus 17 is used in common by the PU 20 and the BIU 14.

Furthermore, in the structure of the conventional microprocessor, when the number of cache memories or the like is increased, it is necessary to increase the number of memory management units (MMU) 13 and the capacity of the internal data bus 17 for controlling operation of these cache memories. Accordingly, the structure of the microprocessor must become more complicated. Moreover, there are similar problems in the case of a multiprocessor comprising a plurality of processors.

SUMMARY OF THE INVENTION

To solve these problems, it is an object of the present invention to provide a microprocessor with greater throughput and having a structure in which the PU and the other structural elements, for example, the external bus control can be separately executed.

Accordingly, the microprocessor of the present invention comprises an arithmetic processing unit for mainly decoding instructions and carrying out arithmetic operations, a group of internal memories composed of address translation tables to store information for translating logic addresses into physical addresses, an cache memories, internal memory control unit for controlling operation of the group of internal memories, an external bus control unit for controlling the input and output of data between a group of external memories mainly composed of external memories and the group of internal memories, a first internal bus for connecting the arithmetic processing unit, the group of internal memories and the internal memory control unit, and for transferring data, such as logic addresses, operands and instructions, and data for the group of internal memories, and a second internal bus for connecting the group of internal memories, the internal memory control unit and the external bus control unit, and for transferring physical addresses and physical data, wherein each of the structural elements of the group of internal memories is connected to the first internal bus and the second internal bus in parallel, and the external bus control unit receives instructions from the internal memory control unit, monitors writing addresses when writing in the group of external memories is required, and eliminates data designated by the same address as the writing address in the group of internal memories, and the internal memory control unit and the external bus control unit can be operated independently of operation of the arithmetic processing unit.

Namely, the microprocessor of the present invention has a structure in which the first internal bus and the second internal bus are separated completely. Moreover, the arithmetic processing unit is connected to the first internal bus only, and is not connected to the second internal bus. Accordingly, since it cannot use the second internal bus directly, the arithmetic processing unit carries out access to the group of internal memories through the first internal bus. The external bus control unit and the internal memory control unit therefore can carry out access to the group of internal memories through the second internal bus separately from the arithmetic processing unit. As a result, each of the arithmetic processing units, the internal memory control unit and the external bus control unit must not be in the waiting-time state during an access operation. Moreover, the internal memory control unit can transfer data mutually in the group of internal memories and the group of external memories without intervention of the arithmetic processing unit.

While, when a control of the external bus is released from the internal memory control unit and the external bus control unit to another external bus master unit (for example, another external processor unit or a DMA controller, not shown), the internal memory control unit and the external memory control unit monitor the state of the external bus. When the group of internal memories requires the data, the internal memory control means and external memory control unit transfer the data carried on the external bus to the group of internal memories through the second internal bus.

Thus, it is possible to keep consistency of data between the group of internal memories and the external memory. Since these processes can be executed in parallel to and completely independently of the operation of the arithmetic processing unit, the throughput of the microprocessor as a whole can be improved.

Moreover, since the group of internal memories are arranged in parallel with the first internal bus and the second internal bus, the number of cache memories and the like can be increased easily, and operation of the increased number of cache memories and the like can be controlled by the internal memory control unit for controlling operation of group of internal memories, further the consistency of data among the group of internal memories can be ensured.

These and other objects, features and advantages of the present invention will be more apparent from the following description of a preferred embodiment, taken in conjunction with the accompanying drawing.

DETAILED DESCRIPTION OF THE EMBODIMENTS

Hereinafter, several embodiments of the present invention will be explained with reference to the drawings.

Figure 1:
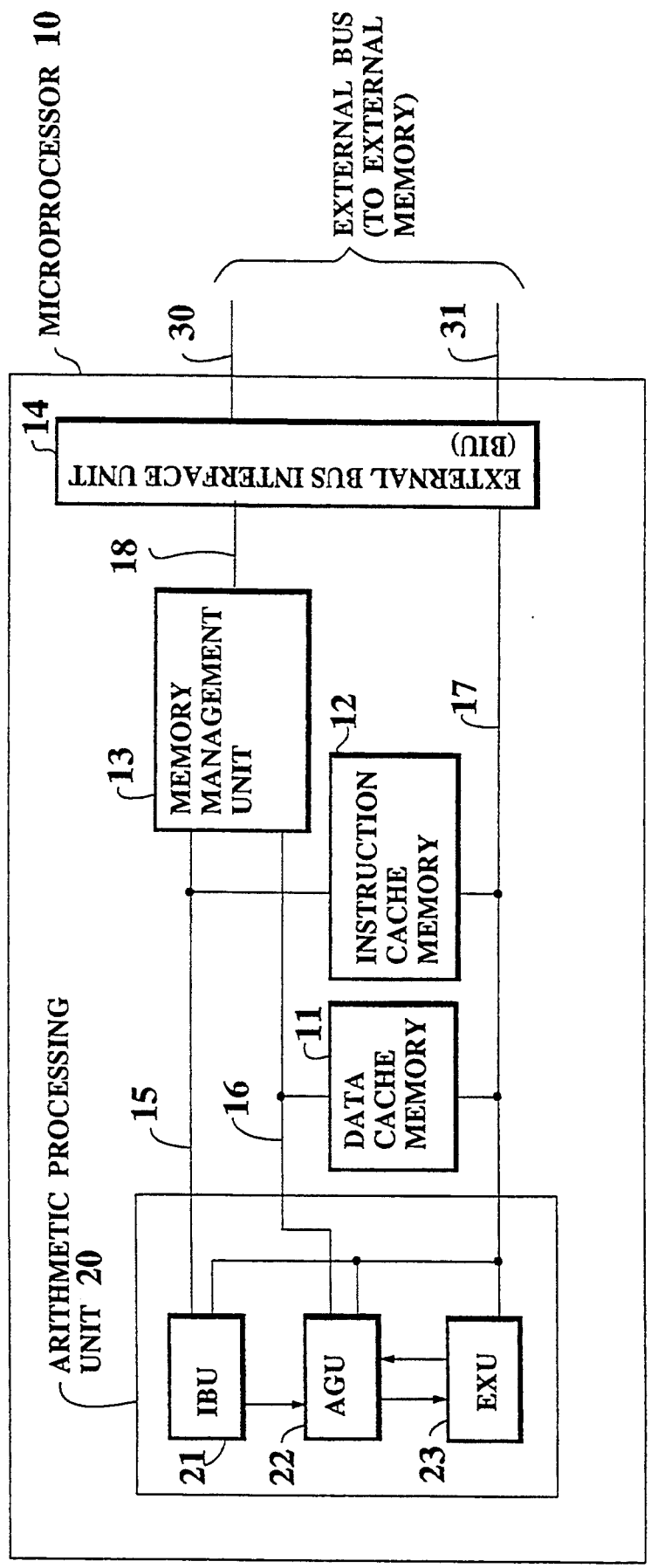
FIG. 1 is a block diagram of a conventional microprocessor.
Figure 2:
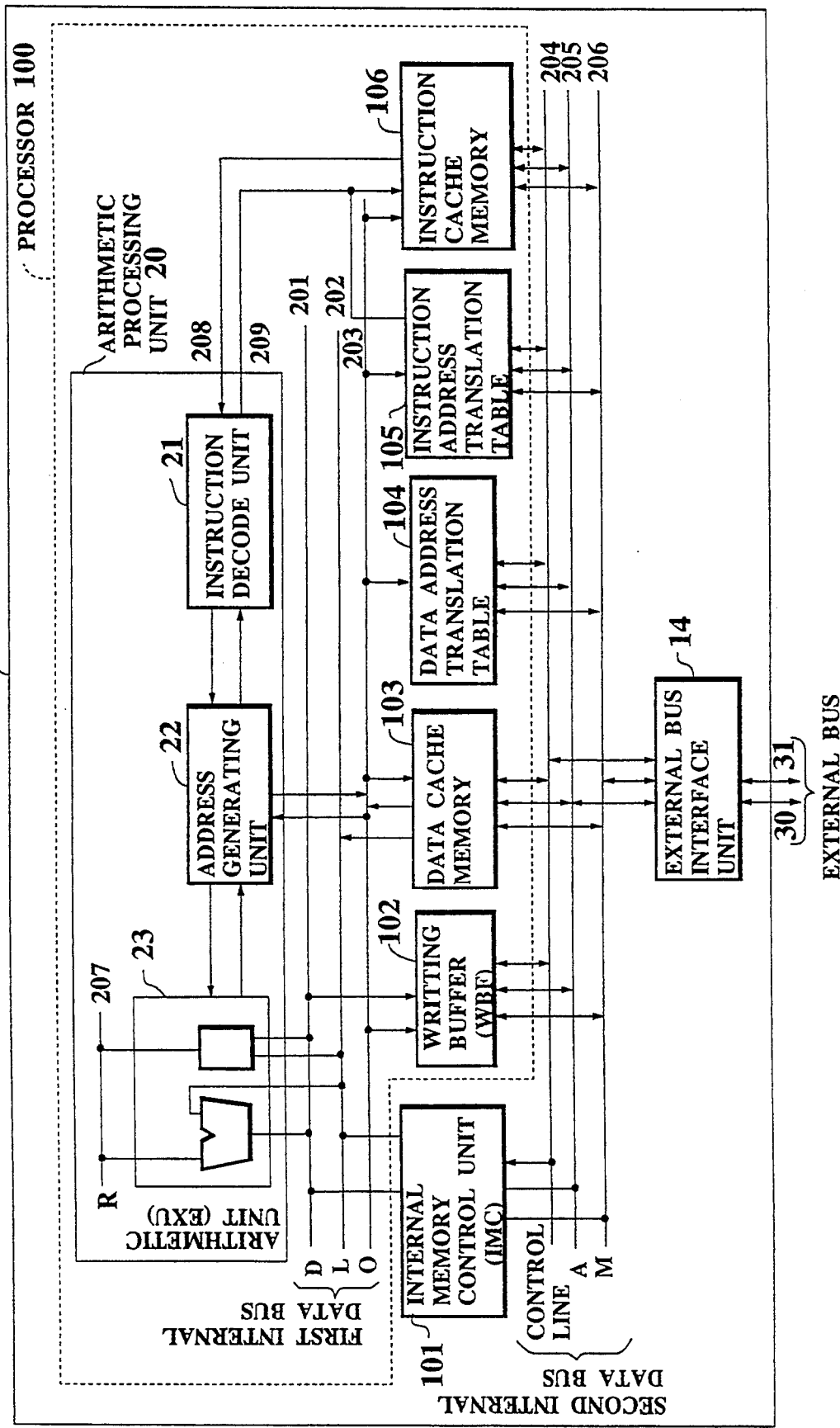
FIG. 2 is a block diagram of a microprocessor as a first embodiment of the present invention.

FIG. 2 is a structural diagram of a microprocessor as a first embodiment of the present invention. In this drawing, the same structural elements as in the conventional embodiment as shown in FIG. 1 are shown by the same reference numerals and characters. An arithmetic processing unit 20 or PU is composed of an instruction decode unit 21, an address generating unit 22 and an arithmetic unit 23. Moreover, a group of internal memories is composed of a writing buffer (WBF) 102, a cache memory and an address translation table.

The WBF 102 temporarily stores data to be written in the cache memory or an external memory. Namely, it acts as a buffer for writing data among outputs of the arithmetic unit in the PU 20 and second internal buses 205, 206. In this embodiment, the WBF 102 is composed of two sets of FIFO buffers (First In First Out). One set of these buffers is made up of areas for storing addresses, data, and attribute information such as the size of data and the logical address thereof.

The cache memory comprises a data cache memory 103 and an instruction cache memory 106 and has two-way set associative construction of 4K bytes×2 in this embodiment. The line size is 16 bytes, and the store algorithm uses a write-through method. The cache memory is composed of address tag memories and data memories, and physical addresses are stored in the address tag memories.

The translation table is used for translating logic addresses into physical addresses which are specific address values in the memories for instruction fetch. The translation table is composed of a data address translation table 104 or data address TLB used for translating logic addresses into physical addresses during reading, writing or instruction fetch, and instruction address translation table 105 or instruction address translation TLB (Translation Lookaside Buffer).

Internal memory control unit 101 or IMC (Internal Memory Control Unit) controls the second internal buses and the group of internal memories. For example, the IMC 101 controls input and output for the cache memory and renewal of the address translation table by microprogram control and a specialized control circuit. Further, the IMC 101 can carry out these controls independently of operation of the PU 20. In the IMC 101, a command register, a working register, a control register, an address adder for address translation, an error detecting circuit for address translation, a microprogram control circuit, a micro ROM, and the specialized control circuit are provided.

The external bus control unit or external interface unit (BIU) 14 controls input and output of data to a group of external memories (not shown). The bus of the microprocessor 300 comprises mainly six buses such as R, L, O, D, A and M.

The R bus 207 is used for data transfer between registers in the PU and between arithmetic units (only one of the arithmetic units is shown in FIG. 2). The L bus 202 is used for substantially the same object as that of the R bus. Moreover, it is also used when memory data are transferred from the data cache memory 103 to the PU 20. The O bus 203 is used as bus for transferring data addresses. In the case of address translation, logic addresses are transferred by this bus 203. The D bus 201 is used for transferring results from the arithmetic unit 23. For example, memory write operands are transferred to the WBF 102 through the D bus 201.

The O, L and D buses described above comprise the first internal bus for transferring logic addresses and data.

The A bus 205 transfers mainly physical addresses for an external memory access. Moreover, when the contents of the TLB are renewed, not only the physical addresses but also memory protective information and error information required for renewal of the TLB are transferred on a bus 205.

The M bus 206 is used for mainly transferring data read from or written in the group of external memories. When renewing the TLB, various information is transferred through this bus as well as the A bus 205. The control line 204 is used for control between the IMC 101 and the respective internal memories. The control line 204, and A and M buses 205, 206 compose the second internal bus for transferring physical addresses and data. The IMC (Internal Memory Control Unit) 101 and the group of internal memories are connected in parallel with respect to the first and the second internal bus.

In the microprocessor 300 of the present invention, the PU 20 is connected to the first internal bus and is completely separated from the second internal bus. Thus, the PU 20 can carry out access of data in the group of internal memories though the first internal bus. The BIU 14 is connected to the second internal bus and is not connected to the first internal bus. The microprocessor 300 of this embodiment is mainly composed of the PU 20, the group of internal memories, the IMC 101, the BIU 14, the first internal buses R, L, O, and D, and the second internal buses A and M buses by which the PU 20, the group of internal memories, IMC 101, and BIU 14 are connected to each other and formed in one chip. Particularly, the arithmetic processing unit 20 and the group of internal memories together constitute a processor 100.

Hereinafter, operation of the microprocessor 300 of this invention will be explained. For example, when instruction fetch is carried out, the PU 20 outputs instruction addresses (as a logical address) to the insctruction cache memory 106 and the instruction address TLB 105 through the control line 209. Thereby, retrieval from the instruction address TLB 105 and retrieval of address tag memory of the instruction cache memory 106 are carried out in parallel. From the result of the retrieval, when an objective instruction address (as a physical address) is in the instruction address TLB 105, and the address coincides with an address obtained by the retrieval of the address tag memory of the instruction cache memory 106 (a cache hit), objective data are cached in the instruction cache memory 106. In this case, the instruction data of the instruction cache memory 106 are transferred to the PU 20.

When the physical address does not coincide with an address obtained by retrieval of the address tag memory, or the result of retrieval of the address tag memory is invalid (a cache miss), the objective instruction data are not cached in the instruction cache memory 106. In this case, the instruction cache memory 106 requests the IMC 101 to cache the objective data.

The request for caching is carried out through the control line 204 in the second internal bus. When the IMC 101 receives the request, it indicates the instruction cache memory 106 should output the physical address to be cached to the A bus 205 through the contol line 204. At the same time, the IMC 101 indicates to the BIU 14 to carry out access of the external memories (not shown) using the address outputted to the A bus.

Since the renewal of the cache memory 106 is carried out every line, the BIU 14 transfers four (4) times data of 4 bytes per line from the external memories to the M bus 206. In this transfer, the data per line is divided into four parts consisting of one word (4 bytes).

On every transfer of one word, the BIU 14 outputs a signal to show that data are transferred on the M bus through the control line 204. The instruction cache memory successively writes data onto the cache memory using this signal. When the transfer of four times per line are completed, the BIU 14 sends a finish signal to the IMC 101. Then, the IMC 101 outputs the finish signal to the instruction cache memory 106 through the control line 204.

While the IMC 101 and BIU 14 send a request for data access to the group of internal memories and the group of external memories, and the second internal bus is used, the PU 20 can carry out access to the group of internal memories through the first internal bus independently, and also can transfer data to other arithmetic units through the R bus 207.

Where the instruction cache memory 106 is disabled by software or where a special address region such as an I/O region in which caching can not be usually carried out is accessed, an instruction fetch as explained below is carried out. The PU 20 outputs an instruction address (as a logical address) to the instruction cache memory 106 and the instruction address translation TLB 105 through the control line 209.

An address translation is performed in the TLB 105 and a retrieve operation is carried out in the cache memory 106. When the translated physical adress is indicated in the non-cacheable region or the cache memory 106 is disabled, the result of the retrieval operation becomes ineffective. Therefore, the cache memory 106 requests operation of a instruction fetch of one (1) word to the 101 through the control line 204. When the IMC 102 receives the requests, it requests the instruction cache memory 106 to output the physical address to the A bus 205.

At the same time, the IMC requests the BIU 14 to carry out instruction data fetch at the address outputted to the A bus 205. All of these operation are performed through the control line 204. The BIU 14 fetches instruction data from the external memories, and outputs them to the M bus 206. Then the instruction cache memory 106 receives the data and transfers them to the PU 20. Completion of the process is carried out in the same manner as in caching.

Next, a read operation for operand data or a read operation for memory data of the PU will be explained.

First, the PU 20 outputs an operand data address to the data cache memory 103 and the data address translation TLB 104 through the O bus 203. At the same time, attributes such as an operand data size and a read/write operand to be required for the PU 20 are also designated to the data cache memory 103.

Similarly to the instruction fetch operation, in a cache operation, a retrieval operation of the address is carried out in the data address TLB 104 and the data cache memory 103. In the case of the cache hit, objective data of the operation are transferred to the PU 20 from the data cache memory 103 through the L bus 202 or O bus 203. In case of the miss cache, the data cache memory 103 gives the IMC 101 a request for a data access operation to the external memories in the same manner as in the instruction cache operation. Then, objective data are transferred into the data cache memory 103 through the BIU 14 and M bus 205. Moreover, data to be required for the PU 20 in the data per line which is read are transferred to it through the O bus 201 and L bus 201. In this manner, the data in the data cache memory 103 are transferred to the PU 20 through the L and O buses 201, 202 included in the first internal bus. With respect to operand data crossing over two pages, these pages are subjected to address translation and a cache retrieval operation respectively.

When an indication is given that the data cache memory 103 is disabled by software, or when there is access to a special region such as a region of the I/O, an operand fetch operation is performed in the same manner the instruction fetch operation as mentioned above. A physical address and attribute information such as the operand size of the address and like are transferred to the BIU 14 and thereby a memory access operation is performed.

In the case for a writing operation of memory data, the PU 20 transfers writing data to the WBF 102 through the D bus. A physical address for the writing operation is translated by an address translation operation before an arithmetic operation at the same timing as the operand read operation, and is transferred first to a buffer of the WBF 102 using exclusive wiring not shown. Since the operational result is not yet contained in the buffer, the buffer is in a reserved state. The address translation operation is carried out in almost the same manner as the operand read operation. After finishing the operation at the PU 20, the PU 20 writes the data into the buffer through the D bus 201.

Then, when the data are contained in the WBF 102, the WBF 20 gives a request for a writing operation to the IMC 101 and BIU 14 through the control line 204. The IMC 101 transfers the data to the cache memory and external memories through the A bus 205 and M bus 206 (Write-Through Method). Moreover, the writing operation in the cache memory and the external memories can be performed at a different time, respectively. After writing signals are outputted from both the cache memory and the BIU, the buffer is in an empty state.

The WBF is installed between an output terminal of the arithmetic processing unit 23 in the PU 20 (or more exactly, the D bus 201) and the second internal bus (A and M buses 205, 206). This is to absorb the difference between the transfer speed of the second internal bus and the execution speed of the arithmetic processing unit 23. Besides the function for absorbing any difference between operational time of the PU 20 and writing time of the external memories, it becomes possible to monitor the writing operation to the cache memories. Thereby, the cache memory reading operation at the PU 20 can be executed in preference to the writing operation at the second internal bus. As a result, the frequency to stop a pipeline in the PU 20 can be reduced. Therefore the operational performance of the processor can be improved.

When an instruction fetch operation or data fetch operation is carried out, retrieval from the data address TLB 104 or instruction address TLB 105 is carried out to translate logic addresses into physical addresses. However, in this case, when there are no objective addresses in the TLB 104 or 105, the following operation is performed.

The TLB 104 or 105 indicates the IMC 101 should store information (which is required for an address translation operation) in the TLB 104 or 105 through the control line 204. Then, the IMC 101 transfers logical addresses to be translated from the TLB 104 or 105 to internal registers through the A bus 205, and an address translation operation under control of a microprogram. After the address translation operation, physical addresses, logical addresses and page protective information are contained in the TLB 104 or 105 through the A bus 205 and M bus 206. The method for virtual storage of this embodiment is the so-called page segment method. Namely, in address translation, the BIU 14 transfers a segment table and a page table in the external memories to the IMC 101 through the A bus 205 and M bus 206. Then the IMC obtains the physical addresses and page protective information based on the data. Starting addresses of the segment tables and the page tables are stored in control registers of the IMC 101 under control of the software.

When an error is detected during the address translation, an error code for showing the contents of the error is transferred to an error register in the TLB 104, 105 through the M bus 206. At the same time, error information is given to the TLB 104 or 105 through the control line 204.

This operation as mentioned above is carried out independently of the operation of the PU 20. After the transferring operation, the IMC 101 gives finish information to the TLB 104 or 105 through the control line 204. Thereby, the instruction fetch operation or data fetch operation of the TLB 104 or 105 and the cache memory 103 or 106 can be restarted.

When control of the external bus is released from the microprocessor 300 to an external bus master unit (for, example, another processor unit or DMA controller unit, not shown), the external buses 30 and 31 are not used, the IMC 101 instructs the BIU 14 to monitor the external buses 30 and 31, and the external bus control line (for example, an address strobe line, a data strobe line and a write enable line, not shown). According to the instruction, when a write enable signal is inputted into the group of external memories from an external master unit, the BIU 14 outputs the external address through the A bus 205. When data at the same address as the external address are cached in the cache memory, the BIU 14 outputs a control signal to the cache memory through the control line 204 to make the data indicated at the same address invalid. The invalidation of the data is performed in every line (16 bytes).

When the above mentioned operation can not be utilized, for example, when the external master has a special hardware composition, it is necessary to make data in the cache memories according to addresses and pages designated by the software invalid. In this embodiment, means for making the address data included in every page (4096 bytes) invalid is introduced. For example, when an instruction for making every page invalid is executed by the PU 20, the PU 20 outputs the page number to be made invalid and an instruction of invalidation for the page to registers in the IMC 101 through the D bus 201. Then, when IMC 101 receives the instruction of the invalidation, it makes the cache memories 103 and 106 invalid.

Next, the procedure of invalidation will be described.

[1] 0 (Entry Number) is set in the internal register of the IMC 101.
[2] A page number designated and the entry number of the cache memory are outputted to the A bus 205 as address data.
[3] At the same time, a control signal to make the cache memory invalid is outputted through the control line 204.
[4] The entry number is increased by 1.
[5] The steps [2] through [4] are repeated until entry operations for all of the entries (256 entries) in the cache memory 103, 106 are completed.

Namely, since the entry operation for making every entry in the cache memories invalid cannot be executed at the same time, the repetition of these steps is required. In this embodiment, since the cache memories 103 and 106 are of the same composition, these steps are repeated 256 times. However, when these cache memories are of different compositions respectively, these steps must be repeated separately in accordance with the respective compositions of the cache memories.

Moreover, the microprocessor of this embodiment performs the function of transferring contents in the cache memory to the external memories for supporting debugging of the software. Namely, when this PU 20 utilizes the function, an instruction for designating this function is executed by the PU 20. The PU 20 designates the cache memories to be actually transferred and target addresses for actually writing the external memories to the IMC 101.

The IMC 101 transfers data in the cache memories to the external memory using the following procedure.

[1] The IMC 101 outputs a request for transfer to the cache memory designated through the control line 204.

[2] The IMC 101 transfers a target address in the external memory to the BIU 14 through the A bus 205.

[3] The IMC outputs a control signal for the transfer request to the cache memory designated through the control line 204.

[4] In the cache memory designated, the contents of a tag memory and data memory are transferred to the M bus 206 successively in accordance with control signal of the step [3].

[5] At the same time, the IMC 101 outputs a control signal to the BIU 14 through the control line 204 to successively write the contents transferred from the M bus 206 into the external memory.

[6] The BIU 14 transfers data to the external memory in accordance with control signal indicated by the step [5].

[7] These steps [3] through [6] are repeated until all of the contents are transferred. When completed, the cache memory designated outputs a finish signal to the IMC 101 through the control line 204.

As mentioned above, all the input and output operations of data through the A bus 205 and M bus 206 are controlled by the IMC 101. Moreover, when these operations are requested at the same time, for example, when renewal of the data cache memory and renewal of the instruction TLB are required at the same time, the IMC 101 negotiates these requests and then executes them according to a predetermined preferential order.

The above mentioned operation of the IMC 101 is carried out independently of the operation of the PU 20. Accordingly, the waiting-time caused by overlapped operation of the IMC 101 and PU 20 can be avoided, thus the reduction of throughput can be prevented.

Next, the function utilizing the second internal bus (including the A bus 205 and M bus 206) and the IMC 101 will be explained as a special example.

Ordinarily, in the case of a large-scale integrated circuit (LSI) such as a microprocessor, a test circuit for testing whether a function can be normally operated or not is incorporated. Moreover, it becomes necessary to test whether internal memories, such as cache memories and TLBs carry out reading and writing correctly or not. In this case, an exclusive circuit is generally incorporated for this purpose. However, in this embodiment, the test circuit is not used by utilizing the IMC 101, A bus 205, M bus 206 and control line 204 for a simpler composition. For example, the IMC controls a test sequence operation, and transfers a test pattern to the cache memory through the A bus 205 and M bus 206. On the contrary, by comparing contents of the cache memory with the pattern, it can be detected whether the cache memory is normally operated or not.

The microprocessor of this embodiment has a composition in which the second internal bus (besides the first internal bus) and the IMC 101 for controlling the second internal bus are provided. These functions as explained above can be realized with ease by only adding a microprogram stored in the IMC 101 and a small amount of hardware.

In the case of alteration of the operation of the IMC 101 or alteration of the register values in the IMC 101, the PU 20 carries these out through the L bus 201 and D bus 202. A command register decides the operation of the IMC 101, and a working register is a supplementary resister for deciding the operation of the IMC 101. Moreover, in a control register, addresses of the translation table (for example, the page table, the section table) and addresses pointed to in the I/O region are stored. By alteration of these registers, alteration of an operational mode or the like is designated.

Figure 3:
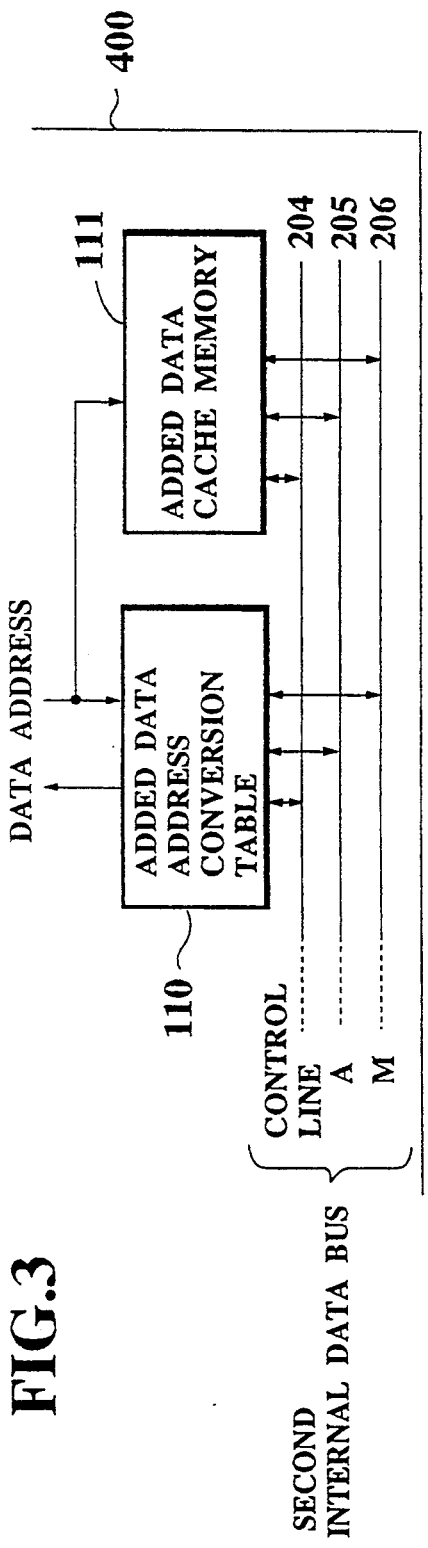
FIG. 3 is a block diagram of a microprocessor as a second embodiment of the present invention.

FIG. 3 is a structural diagram of a microprocessor 400 as a second embodiment of the present invention. In this drawing, the same structural elements as those in the first embodiment are denoted by the same reference numerals or characters, and explanation of these elements is omitted here. In this embodiment, a data cache memory 111 and a data address TLB 110 are added as compared with the microprocessor of the first embodiment. Moreover, in this drawing, the arithmetic processing unit PU, internal memory control unit IMC, a group of internal memories and the like are omitted for simplification. These structural elements added are connected to a first internal bus and a second internal bus in the same manner as the cache memories and the translation tables in the first embodiment. Moreover, a further cache memory and address TLB can be added if necessary. To control this group of internal memories and those added, it is necessary to provide only one IMC and one BIU. Operation of the IMC and BIU is carried out in the same manner as described in the first embodiment. This embodiment is more effective in the case of adding cache memories and address TLB separated in a chip. Thereby, high-speed operation of a microprocessor can be achieved.

Figure 4:
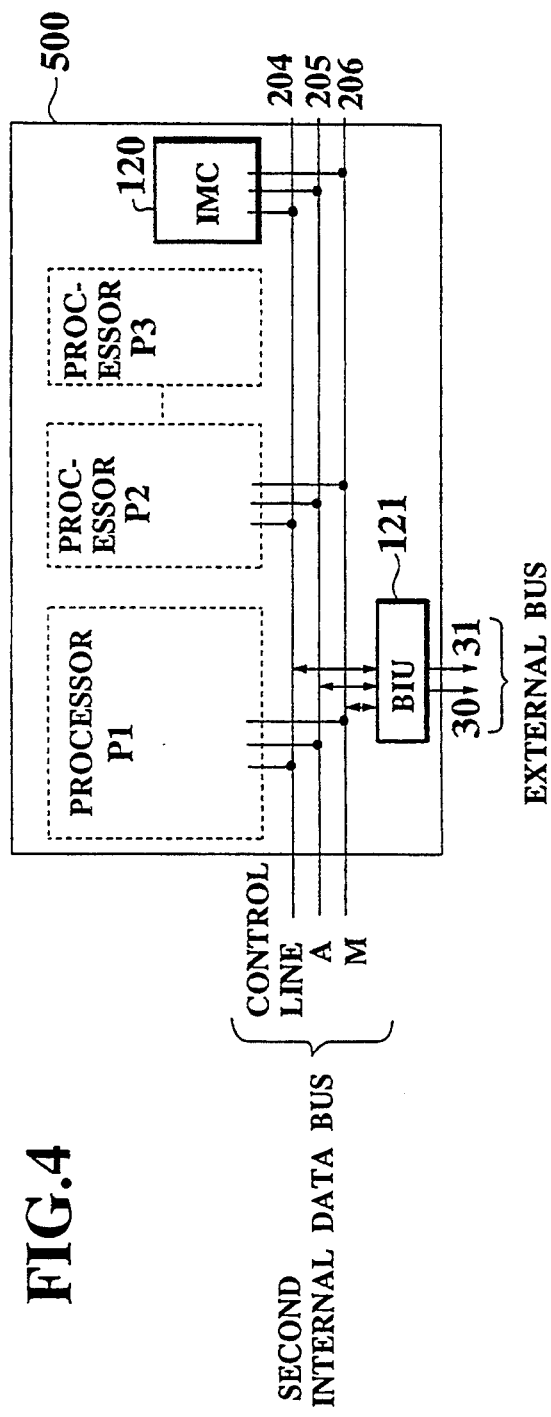
FIG. 4 is a block diagram of a microprocessor as a third embodiment of the present invention.

FIG. 4 is a structural diagram of a microprocessor 500 as a third embodiment of the present invention. In this drawing, the same structural elements as those in the first embodiment are denoted by the same reference numerals or chracters, and an explanation on these elements is omitted here. In this embodiment, a plurality of processors Pn (n is a natural number) are provided in the microprocessor 500 and these are provided in one chip. These processors Pn are connected to second internal bus in parallel, respectively. For the plurality of processors Pn, one IMC 120 and one BIU 121 are provided. In the microprocessor 500 having the composition as mentioned above, for example, when a processor P1 carries out a memory data write operation, the IMC 120 transmits data to the BIU 121 through an A bus 205 and an M bus 206 in the second internal bus, and also transmits the data to the other processors P2 to Pn through the buses 205 and 206. Thereby, consistency of contents of the data can be mentioned among the respective processors P1 to Pn. Moreover, since the microprocessor is composed of a plurality of processors, high-speed processing can be realized.

Various modifications will become possible for those skilled in the art after receiving the teachings of the present disclosure without departing from the scope thereof.

What is claimed is:

1. A microprocessor comprising:
   an arithmetic processing unit;
   a group of internal memories comprising address translation table means for storing information for translating logic addresses into physical addresses, and cache memory means for storing information for translating logic addresses into physical addresses;

internal memory control means for controlling a data input/output operation between external memories and said group of internal memories;

a first group of internal buses for connecting said arithmetic processing unit, said group of internal memories and said internal memory control means, and for transferring logical addresses and data between said arithmetic processing unit and said group of internal memories; and a second group of internal buses for connecting said group of internal memories, said internal memory control means and external bus control means, and for transferring physical addresses and data among said group of internal memories and said external memories, each element in said group of internal memories and said internal memory control means being connected to said first group of internal buses and to said second group of internal buses in parallel, and said internal memory control means controlling use of said second group of internal buses, a data input/output operation to said cache memory means, and updating operation of said address translation table means, wherein said internal memory control means is connected between said first group of internal buses and said second group of internal buses and wherein the use of said first group of internal buses is controlled by said arithmetic processing unit, and the use of said second group of internal buses is controlled by said internal memory control means, both of said arithmetic processing unit and said internal memory control means being executed independently.

2. A microprocessor according to claim 1, wherein said cache memory means comprises a plurality of cache memories, and one internal memory control means is provided for all of said group of internal memories.

3. A microprocessor according to claim 1, wherein each cache memory in said cache memory means comprises an instruction cache memory and a data cache memory, and is provided with an address translation table, and wherein said instruction cache memory and said data cache memory are connected to said first group of internal buses and said second group of internal buses.

4. A microprocessor according to claim 1, wherein said arithmetic processing unit, said group of internal memories, said internal memory control means, said external bus control means, said first group of internal buses and said second group of internal buses are provided on one chip.

5. A microprocessor according to claim 1, wherein said external bus control means receives an instruction provided from said internal memory control means, monitors a writing address when a writing operation for said external memories occurs, and eliminates data stored in said group of internal memories when an address of data in said internal memories is equal to a writing address, and said internal memory control means, said external bus control means, and said arithmetic processing unit operate independently of each other.

6. A microprocessor according to claim 1, further comprising:

write buffer means, incorporated between said first group of internal buses and said second group of internal buses, for temporarily storing data to be transferred between said first group of internal buses and said second group of internal buses.

7. A microprocessor according to claim 1, wherein data transfer via said first group of internal buses and data transfer via said second group of internal buses are carried out substantially independently of each other.

8. A microprocessor comprising:

a plurality of arithmetic processing units;

a plurality of internal memory groups, each comprising address translation tables for storing information for translating logic addresses into physical addresses, and cache memories for storing information for translating logical addresses into physical addresses, each of said internal memory groups being connected to each of said arithmetic processing units;

a first group of internal buses for connecting said arithmetic processing units, an internal memory control means and said internal memory groups, and for transferring logical addresses and data among said arithmetic processing units and said internal memory groups;

a second group of internal buses for connecting said internal memory groups and said internal memory control means, and for transferring physical addresses and data among said internal memory groups;

said internal memory control means for controlling a data access operation through said internal buses, said internal memory control means being connected between said first group of internal buses and said second group of internal buses;

each element in said internal memory groups and said internal memory control means being connected to said first group of internal buses and said second group of internal buses in parallel, and said internal memory control means controlling use of said second group of internal buses, a data input/output operation to said cache memories, and updating operation of said address translation tables, and wherein said internal memory control means is connected between said first group of internal buses and said second group of internal buses and wherein the use of said first group of internal buses is controlled by said arithmetic processing unit, and the use of said second group of internal buses is controlled by said internal memory control means, both of said arithmetic processing unit and said internal memory control means being executed independently.

9. A microprocessor according to claim 8, wherein there is one said internal memory control means.

10. A microprocessor according to claim 8, wherein said microprocessor is formed on one chip.

11. A microprocessor according to claim 8, wherein data transfer via said first group of internal buses and data transfer via said second group of internal buses are carried out substantially independently of each other.

* * * * *